(12) United States Patent
Banerjee et al.

(10) Patent No.: US 11,461,776 B2
(45) Date of Patent: Oct. 4, 2022

(54) METHOD, SYSTEM, AND COMPUTER PROGRAM PRODUCT FOR REPRESENTING AN IDENTIFIER WITH A SEQUENCE OF WORDS

(71) Applicant: Visa International Service Association, San Francisco, CA (US)

(72) Inventors: Kshitij Banerjee, Singapore (SG); Aditi Rungta, Singapore (SG); Seng Zhe Yep, Singapore (SG); Saw Thanda Oo, Singapore (SG); Shanlan Li, Singapore (SG)

(73) Assignee: Visa International Service Association, San Francisco, CA (US)

(*) Notice: Subject to any disclaimer, the term of this patent is extended or adjusted under 35 U.S.C. 154(b) by 20 days.

(21) Appl. No.: 16/224,864

(22) Filed: Dec. 19, 2018

(65) Prior Publication Data

US 2020/0202340 A1   Jun. 25, 2020

(51) Int. Cl.
*G06Q 20/38* (2012.01)
*G06Q 20/20* (2012.01)
*G06Q 20/40* (2012.01)
*G06F 40/157* (2020.01)

(52) U.S. Cl.
CPC ......... *G06Q 20/385* (2013.01); *G06F 40/157* (2020.01); *G06Q 20/20* (2013.01); *G06Q 20/40* (2013.01)

(58) Field of Classification Search
CPC .................................................. G06Q 20/385
See application file for complete search history.

(56) References Cited

U.S. PATENT DOCUMENTS

2014/0163988 A1* 6/2014 Rahim ................. G10L 15/142

FOREIGN PATENT DOCUMENTS

WO    WO2020002406    *  1/2020

OTHER PUBLICATIONS

Zaeem, et al., in "Modeling and analysis of identity threat behaviors through text mining of identity theft stories," from Computer and Security, 65, 2017, pp. 50-63 (Year: 2017).*
"what3words | Addressing the world", https://what3words.com/, 4 pages.

* cited by examiner

*Primary Examiner* — Olabode Akintola
*Assistant Examiner* — Brandon M Duck
(74) *Attorney, Agent, or Firm* — The Webb Law Firm (57) ABSTRACT

Provided is a method for representing an identifier (e.g., primary account number (PAN)) of a customer with a sequence of words. The method may include dividing the identifier (e.g., PAN) of a customer into a plurality of subsets of digits. A respective word from a database of words may be determined for each respective subset of digits of the plurality of subsets of digits. The respective words for the plurality of subsets of digits may be combined into a sequence of words. The sequence of words may be provided to a customer device of the customer. A system and computer program product are also disclosed.

9 Claims, 4 Drawing Sheets

METHOD, SYSTEM, AND COMPUTER PROGRAM PRODUCT FOR REPRESENTING AN IDENTIFIER WITH A SEQUENCE OF WORDS

BACKGROUND

1. Field

This disclosed subject matter relates generally to methods, systems, and products for representing an identifier with a sequence of words and, in some particular embodiments, to a method, system, and computer program product for representing a primary account number (PAN) of a customer with a sequence of words.

2. Technical Considerations

Certain interactions (e.g., online interactions, payment transactions, money transfers, and/or the like) may depend on using an identifier (e.g., social security number, online username, account identifier, a primary account number (PAN), a card number, a payment card number, a token, and/or the like) to identify a user (e.g., customer and/or the like) involved in the interaction. For example, the user may need to provide, communicate, and/or input (e.g., type, speak, and/or the like) such an identifier.

However, using and/or communicating certain identifiers (e.g., numeric identifiers such as social security numbers, PANs, and/or the like) may be challenging. For example, such identifiers may be difficult to remember. Additionally or alternatively, using such identifiers may be prone to errors, e.g., because the user (e.g., customer and/or the like) may misremember the identifier, mistakenly input the identifier (e.g., mistype, misspeak, and/or the like), and/or the like. Additionally or alternatively, if a user (e.g., customer and/or the like) does not remember the identifier or does not trust his or her memory of such an identifier, such user may have to spend time searching for a record of the identifier (e.g., social security card, payment card, debit card, credit card, account identification device, portable financial device, quick response (QR) code, written or electronic copy of username, and/or the like).

SUMMARY

Accordingly, it is an object of the presently disclosed subject matter to provide methods, systems, and computer program products for representing an identifier with a sequence of words.

According to non-limiting embodiments, provided is a method for representing an identifier (e.g., account identifier number such as a primary account number (PAN) of a customer) with a sequence of words. In some non-limiting embodiments, a method for representing an identifier (e.g., account identifier number such as a PAN) with a sequence of words may include dividing an account identifier number of a customer into a plurality of subsets of digits. A respective word from a database of words may be determined for each respective subset of digits of the plurality of subsets of digits. The respective words for the plurality of subsets of digits may be combined into a sequence of words. The sequence of words may be provided to a customer device of the customer.

In some non-limiting embodiments, the plurality of subsets of digits may include a first subset of three digits, a second subset of four digits, a third subset of four digits, and a fourth subset of four digits. Additionally or alternatively, the respective word for the first subset may include an adverb, the respective word for the second subset may include a first adjective, the respective word for the third subset may include a second adjective, and the respective word for the fourth subset may include a noun. Additionally or alternatively, the sequence of words may include, in order, the adverb, the first adjective, the second adjective, and the noun.

In some non-limiting embodiments, a dictionary may be received, and the dictionary may include a plurality of words. Additionally or alternatively, a portion of the plurality of words may be filtered from the dictionary. Additionally or alternatively, a remaining portion of the plurality of words may be stored as the database of words.

In some non-limiting embodiments, at least one word from the database of words may be assigned for each possible subset of digits. Additionally or alternatively, determining the respective word from the database of words for each respective subset of digits may include determining the at least one word from the database of words assigned to a possible subset of digits corresponding to the respective subset of digits.

In some non-limiting embodiments, an authorization request for a payment transaction may be received from a merchant system, and the authorization request may include the sequence of words. Additionally or alternatively, a reconstructed subset of digits for each word of the sequence of words may be determined. Additionally or alternatively, the reconstructed subsets of digits may be combined into a reconstructed account identifier number. Additionally or alternatively, the reconstructed account identifier number may be determined to match the account identifier number of the customer. Additionally or alternatively, the payment transaction may be processed using the account identifier number of the customer.

According to non-limiting embodiments, provided is a system for representing an identifier (e.g., account identifier number such as a PAN) with a sequence of words. In some non-limiting embodiments, the system for representing an identifier (e.g., account identifier number such as a PAN) with a sequence of words may include a transaction service provider system. The transaction service provider system may divide an account identifier number of a customer into a plurality of subsets of digits. The transaction service provider system may determine a respective word from a database of words for each respective subset of digits of the plurality of subsets of digits. The transaction service provider system may combine the respective words for the plurality of subsets of digits into a sequence of words. The transaction service provider system may communicate the sequence of words over a network.

In some non-limiting embodiments, the system may further include a customer device of the customer. The customer device may receive, from the transaction service provider system over the network, the sequence of words.

In some non-limiting embodiments, the plurality of subsets of digits may include a first subset of three digits, a second subset of four digits, a third subset of four digits, and a fourth subset of four digits. Additionally or alternatively, the respective word for the first subset may include an adverb, the respective word for the second subset may include a first adjective, the respective word for the third subset may include a second adjective, and the respective word for the fourth subset may include a noun. Additionally or alternatively, the sequence of words may include, in order, the adverb, the first adjective, the second adjective, and the noun.

In some non-limiting embodiments, the transaction service provider system may further receive a dictionary comprising a plurality of words. Additionally or alternatively, the transaction service provider system may further filter a portion of the plurality of words from the dictionary. Additionally or alternatively, the transaction service provider system may further store a remaining portion of the plurality of words as the database of words.

In some non-limiting embodiments, the transaction service provider system may further assign at least one word from the database of words for each possible subset of digits. Additionally or alternatively, determining the respective word from the database of words for each respective subset of digits may include determining the at least one word from the database of words assigned to a possible subset of digits corresponding to the respective subset of digits.

In some non-limiting embodiments, the transaction service provider system may further receive, over the network, an authorization request for a payment transaction from a merchant system, and the authorization request may include the sequence of words. Additionally or alternatively, the transaction service provider system may further determine a reconstructed subset of digits for each word of the sequence of words. Additionally or alternatively, the transaction service provider system may further combine the reconstructed subsets of digits into a reconstructed account identifier number. Additionally or alternatively, the transaction service provider system may further determine the reconstructed account identifier number matches the account identifier number of the customer. Additionally or alternatively, the transaction service provider system may further communicate a second authorization request for the payment transaction including the reconstructed account identifier number over the network.

In some non-limiting embodiments, the system may further include an issuer system configured to receive, from the transaction service provider system over the network, the second authorization request.

According to non-limiting embodiments, provided is a computer program product for representing an identifier (e.g., account identifier number such as a PAN) with a sequence of words. The computer program product may include at least one non-transitory computer-readable medium including one or more instructions that, when executed by at least one processor, cause the at least one processor to divide an account identifier number of a customer into a plurality of subsets of digits. A respective word from a database of words may be determined for each respective subset of digits of the plurality of subsets of digits. The respective words for the plurality of subsets of digits may be combined into a sequence of words. The sequence of words may be provided to a customer device of the customer.

In some non-limiting embodiments, the plurality of subsets of digits may include a first subset of three digits, a second subset of four digits, a third subset of four digits, and a fourth subset of four digits. Additionally or alternatively, the respective word for the first subset may include an adverb, the respective word for the second subset may include a first adjective, the respective word for the third subset may include a second adjective, and the respective word for the fourth subset may include a noun. Additionally or alternatively, the sequence of words may include, in order, the adverb, the first adjective, the second adjective, and the noun.

In some non-limiting embodiments, a dictionary may be received, and the dictionary may include a plurality of word. Additionally or alternatively, a portion of the plurality of words may be filtered from the dictionary. Additionally or alternatively, a remaining portion of the plurality of words may be stored as the database of words.

In some non-limiting embodiments, at least one word from the database of words may be assigned for each possible subset of digits. Additionally or alternatively, determining the respective word from the database of words for each respective subset of digits may include determining the at least one word from the database of words assigned to a possible subset of digits corresponding to the respective subset of digits.

In some non-limiting embodiments, an authorization request for a payment transaction may be received from a merchant system, and the authorization request may include the sequence of words. Additionally or alternatively, a reconstructed subset of digits for each word of the sequence of words may be determined. Additionally or alternatively, the reconstructed subsets of digits may be combined into a reconstructed account identifier number. Additionally or alternatively, the reconstructed account identifier number may be determined to match the account identifier number of the customer. Additionally or alternatively, the payment transaction may be processed using the account identifier number of the customer.

Further embodiments are set forth in the following numbered clauses:

Clause 1: A method for representing an account identifier number of a customer with a sequence of words, comprising: dividing, with at least one processor, a account identifier number of a customer into a plurality of subsets of digits; determining, with at least one processor, a respective word from a database of words for each respective subset of digits of the plurality of subsets of digits; combining, with at least one processor, the respective words for the plurality of subsets of digits into a sequence of words; and providing, with at least one processor, the sequence of words to a customer device of the customer.

Clause 2: The method of clause 1, wherein the plurality of subsets of digits comprises a first subset of three digits, a second subset of four digits, a third subset of four digits, and a fourth subset of four digits.

Clause 3: The method of clauses 1 or 2, wherein the respective word for the first subset comprises an adverb, the respective word for the second subset comprises a first adjective, the respective word for the third subset comprises a second adjective, and the respective word for the fourth subset comprises a noun.

Clause 4: The method of any preceding clause, wherein the sequence of words comprises, in order, the adverb, the first adjective, the second adjective, and the noun.

Clause 5: The method of any preceding clause, further comprising: receiving, with at least one processor, a dictionary comprising a plurality of words; filtering, with at least one processor, a portion of the plurality of words from the dictionary; and storing, with at least one processor, a remaining portion of the plurality of words as the database of words.

Clause 6: The method of any preceding clause, further comprising: assigning, with at least one processor, at least one word from the database of words for each possible subset of digits, wherein determining the respective word from the database of words for each respective subset of digits comprises determining, with at least one processor, the at least one word from the database of words assigned to a possible subset of digits corresponding to the respective subset of digits.

Clause 7: The method of any preceding clause, further comprising: receiving, with at least one processor, an authorization request for a payment transaction from a merchant system, the authorization request including the sequence of words; determining, with at least one processor, a reconstructed subset of digits for each word of the sequence of words; combining, with at least one processor, the reconstructed subsets of digits into a reconstructed account identifier number; determining, with at least one processor, the reconstructed account identifier number matches the account identifier number of the customer; and processing, with at least one processor, the payment transaction using the account identifier number of the customer.

Clause 8: A system for representing an account identifier number of a customer with a sequence of words, comprising: a transaction service provider system configured to: divide an account identifier number of a customer into a plurality of subsets of digits; determine a respective word from a database of words for each respective subset of digits of the plurality of subsets of digits; combine the respective words for the plurality of subsets of digits into a sequence of words; and communicate the sequence of words over a network.

Clause 9: The system of clause 8, further comprising a customer device of the customer configured to receive, from the transaction service provider system over the network, the sequence of words.

Clause 10: The system of clause 8 or 9, wherein the plurality of subsets of digits comprises a first subset of three digits, a second subset of four digits, a third subset of four digits, and a fourth subset of four digits, wherein the respective word for the first subset comprises an adverb, the respective word for the second subset comprises a first adjective, the respective word for the third subset comprises a second adjective, and the respective word for the fourth subset comprises a noun, and wherein the sequence of words comprises, in order, the adverb, the first adjective, the second adjective, and the noun.

Clause 11: The system of any one of clauses 8-10, wherein the transaction service provider system is further configured to: receive a dictionary comprising a plurality of words; filter a portion of the plurality of words from the dictionary; and store a remaining portion of the plurality of words as the database of words.

Clause 12: The system of any one of clauses 8-11, wherein the transaction service provider system is further configured to: assign at least one word from the database of words for each possible subset of digits, wherein determining the respective word from the database of words for each respective subset of digits comprises determining the at least one word from the database of words assigned to a possible subset of digits corresponding to the respective subset of digits.

Clause 13: The system of any one of clauses 8-12, wherein the transaction service provider system is further configured to: receive, over the network, an authorization request for a payment transaction from a merchant system, the authorization request including the sequence of words; determine a reconstructed subset of digits for each word of the sequence of words; combine the reconstructed subsets of digits into a reconstructed account identifier number; determine the reconstructed account identifier number matches the account identifier number of the customer; and communicate a second authorization request for the payment transaction including the reconstructed account identifier number over the network.

Clause 14: The system of any one of clauses 8-13, further comprising an issuer system configured to receive, from the transaction service provider system over the network, the second authorization request.

Clause 15: A computer program product for representing an account identifier number of a customer with a sequence of words, the computer program product comprising at least one non-transitory computer-readable medium including one or more instructions that, when executed by at least one processor, cause the at least one processor to: divide an account identifier number of a customer into a plurality of subsets of digits; determine a respective word from a database of words for each respective subset of digits of the plurality of subsets of digits; combine the respective words for the plurality of subsets of digits into a sequence of words; and provide the sequence of words to a customer device of the customer.

Clause 16: The computer program product of clause 15, wherein the plurality of subsets of digits comprises a first subset of three digits, a second subset of four digits, a third subset of four digits, and a fourth subset of four digits.

Clause 17: The computer program product of clause 15 or 16, wherein the respective word for the first subset comprises an adverb, the respective word for the second subset comprises a first adjective, the respective word for the third subset comprises a second adjective, and the respective word for the fourth subset comprises a noun, and wherein the sequence of words comprises, in order, the adverb, the first adjective, the second adjective, and the noun.

Clause 18: The computer program product of any one of clauses 15-17, wherein the one or more instructions, when executed by the at least one processor, further cause the at least one processor to: receive a dictionary comprising a plurality of words; filter a portion of the plurality of words from the dictionary; and store a remaining portion of the plurality of words as the database of words.

Clause 19: The computer program product of any one of clauses 15-18, wherein the one or more instructions, when executed by the at least one processor, further cause the at least one processor to: assign at least one word from the database of words for each possible subset of digits, wherein determining the respective word from the database of words for each respective subset of digits comprises determining the at least one word from the database of words assigned to a possible subset of digits corresponding to the respective subset of digits.

Clause 20: The computer program product of any one of clauses 15-19, wherein the one or more instructions, when executed by the at least one processor, further cause the at least one processor to: receive an authorization request for a payment transaction from a merchant system, the authorization request including the sequence of words; determine a reconstructed subset of digits for each word of the sequence of words; combine the reconstructed subsets of digits into a reconstructed account identifier number; determine the reconstructed account identifier number matches the account identifier number of the customer; and process the payment transaction using the account identifier number of the customer.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to systems, methods, and computer program products for representing an identifier with a sequence of words, including, but not limited to, representing a primary account number (PAN) of a customer with a sequence of words. For example, non-limiting embodiments of the disclosed subject matter provide dividing an account identifier (e.g., PAN) into a plurality of subsets (e.g., of digits), determining a respective word for each respective subset, and combining the words into a sequence of words. Such embodiments provide techniques and systems for representing account identifiers (e.g., PANs) with information (e.g., a sequence of words) that is easier to use. For example, such a sequence of words may be easier for a user (e.g., customer) to remember. Additionally or alternatively, such a sequence of words may be less prone to error e.g., because the user (e.g., customer) may be more likely to correctly remember the sequence of words and/or may be less likely to mistakenly input the sequence of words (e.g., mistype, misspeak, and/or the like). Additionally or alternatively, such a sequence of words may be easily used (e.g., input, typed, spoken, and/or the like) for interactions (e.g., online interactions, online payment transactions, card-not-present payment transactions, money transfers, and/or the like) without a need for a separate device (e.g., identification card, social security card, payment card, debit card, credit card, account identification device, portable financial device, quick response (QR) code, written or electronic copy of username, and/or the like). Additionally or alternatively, by using such a sequence of words, the user need not spend time searching for a record of the identifier and/or associated device. Additionally or alternatively, such a sequence of words may include words from a familiar language and/or dictionary (e.g., English words from an English dictionary for an English speaker, French words from a French dictionary for a French speaker, and/or the like), and the use of words familiar to the user may improve the user's ability to remember the sequence of words, improve the user's confidence is his or her memory of the sequence of words, and/or the like. Additionally or alternatively, a mapping of words to possible subsets (e.g., of digits) may be published as a standard, which may promote widespread adoption and/or allow a user (e.g., customer and/or the like) or other entity (e.g., merchant, acquirer, transaction service provider, issuer, and/or the like) to quickly determine a sequence of words for representing an identifier (e.g., PAN) or quickly reconstruct an identifier (e.g., reconstructed PAN) based on a sequence of words. Additionally or alternatively, such a sequence of words may increase a user's (e.g., customer's and/or the like) propensity to interact (e.g., online interactions, payment transactions, money transfers, and/or the like), e.g., because such user may more easily remember the sequence of words (e.g., compared to the identifier represented thereby) and/or because the use of the sequence of words will be less prone to error in such interactions. Additionally or alternatively, for users that have difficulty with technological devices device (e.g., portable financial devices, quick response (QR) code devices, electronic copies of usernames, and/or the like), a sequence of words may be easier to use than such technological devices. Non-limiting embodiments of the disclosed subject matter provide using a hash function (e.g., minimal perfect hash function) to represent an identifier (e.g., PAN) with a sequence of words. Such embodiments provide techniques and systems for representing account identifiers (e.g., PANs) that allow for distributing (e.g., communicating) a hash function or selected set(s) of hash functions while obviating and/or avoiding distribution of a lookup table and/or dictionary or words. For example, a transaction service provider system may store such a lookup table, but only a limited set of hash functions (e.g., a first function that returns an integer based on an input word and/or a second function that returns an indication whether a word is valid) may be distributed to other systems and/or devices connected via networks (e.g., issuer systems, customer devices, merchant systems, acquirer systems, and/or the like). As such, transaction service provider system may generate a sequence of words representing the identifier (e.g., PAN) that can be used by the other systems and/or devices without exposing the lookup table for such a mapping between words and numbers. Additionally or alternatively, security may be improved because it may be very difficult for an attacker to predict a sequence of words representing an identifier (e.g., PAN) based solely on the (distributed) hash function(s) without the lookup table.

For the purpose of illustration, in the following description, while the presently disclosed subject matter is described with respect to methods, systems, and computer program products for representing an identifier with a sequence of words, e.g., representing a primary account number (PAN) of a customer with a sequence of words, one skilled in the art will recognize that the disclosed subject matter is not limited to the illustrative embodiments. For example, the methods, systems, and computer program products described herein may be used with a wide variety of settings, such as representing a number and/or identifier as a sequence of words in any setting suitable for using such number and/or identifier, e.g., to identify individuals, objects, things, devices, equipment, computers, computer systems, virtual items, places, events, and/or the like.

Figure 1:
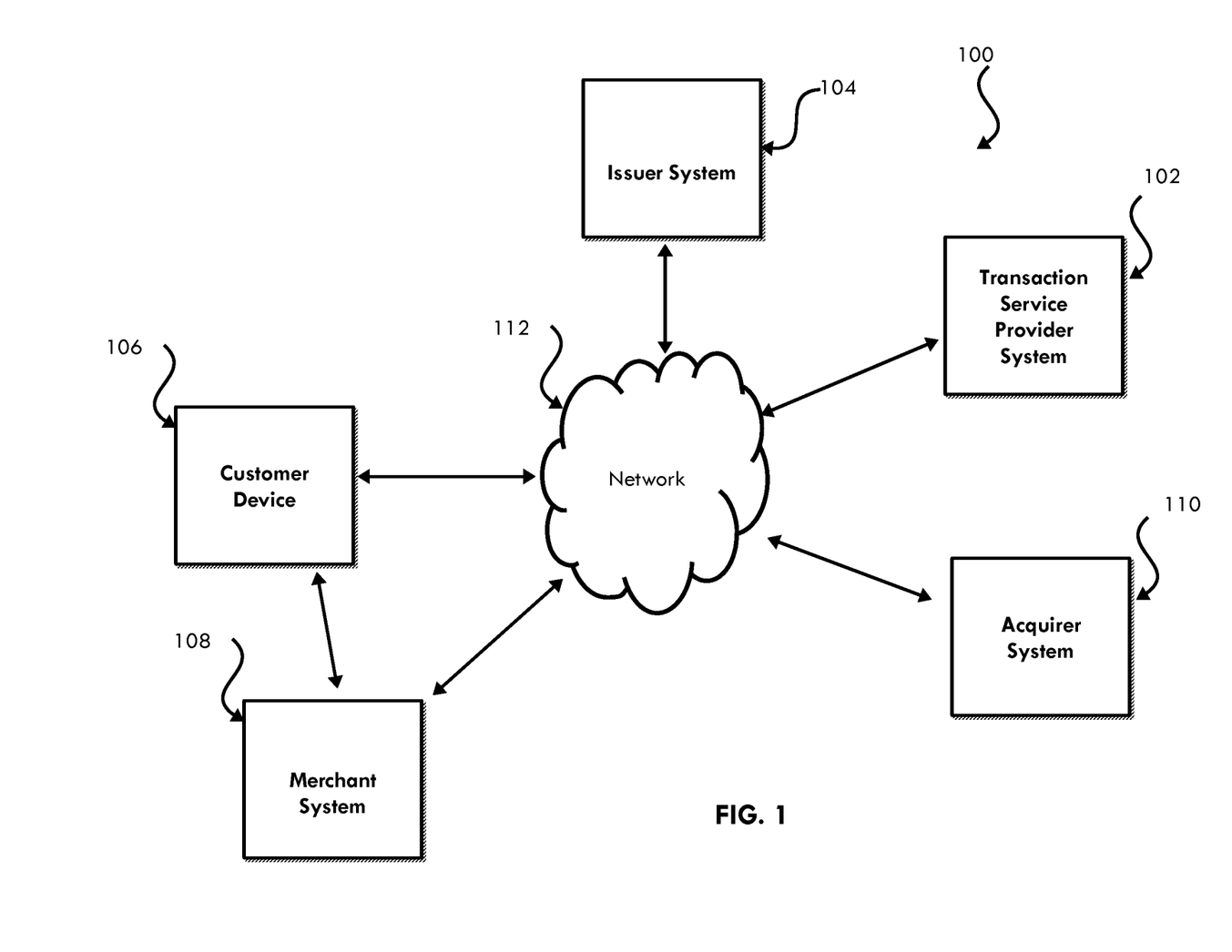
FIG. 1 is a diagram of a non-limiting embodiment of an environment in which methods, systems, and/or computer program products, described herein, may be implemented according to the principles of the presently disclosed subject matter.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
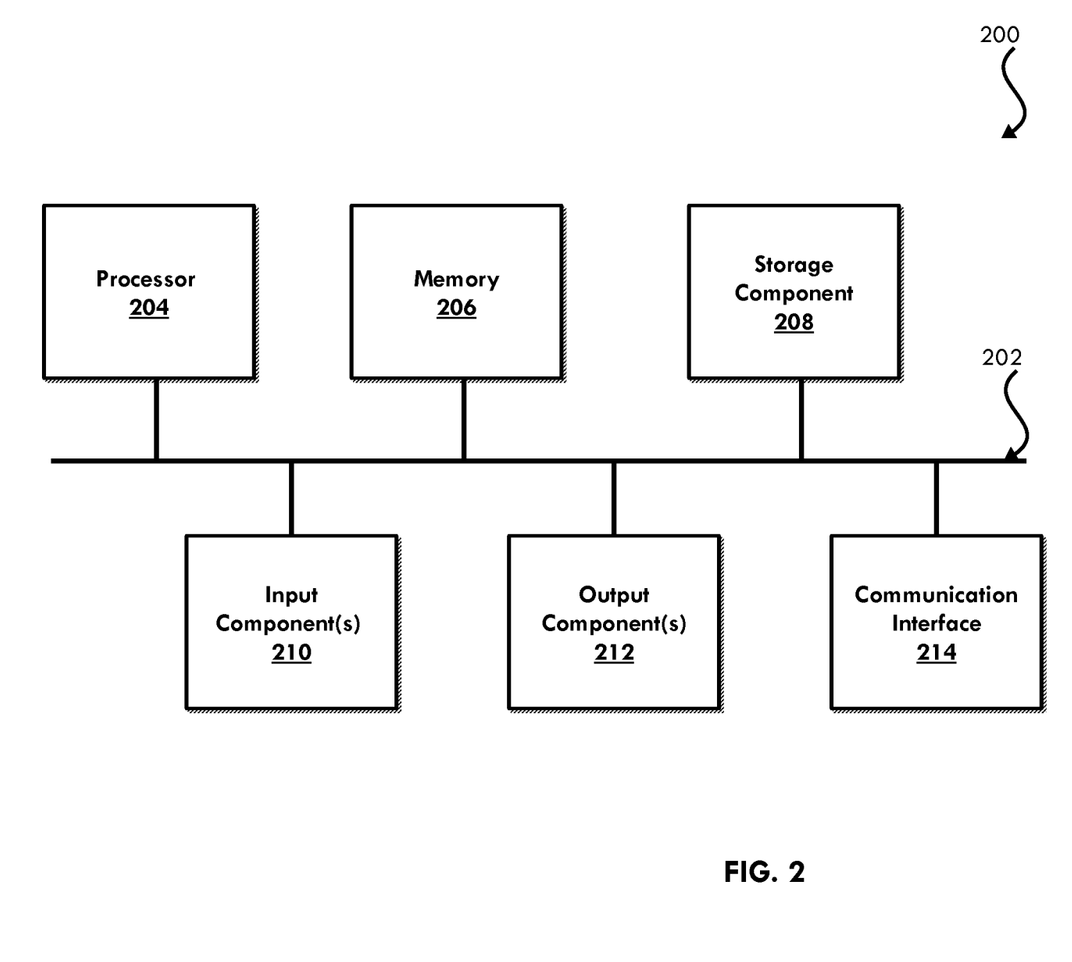
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
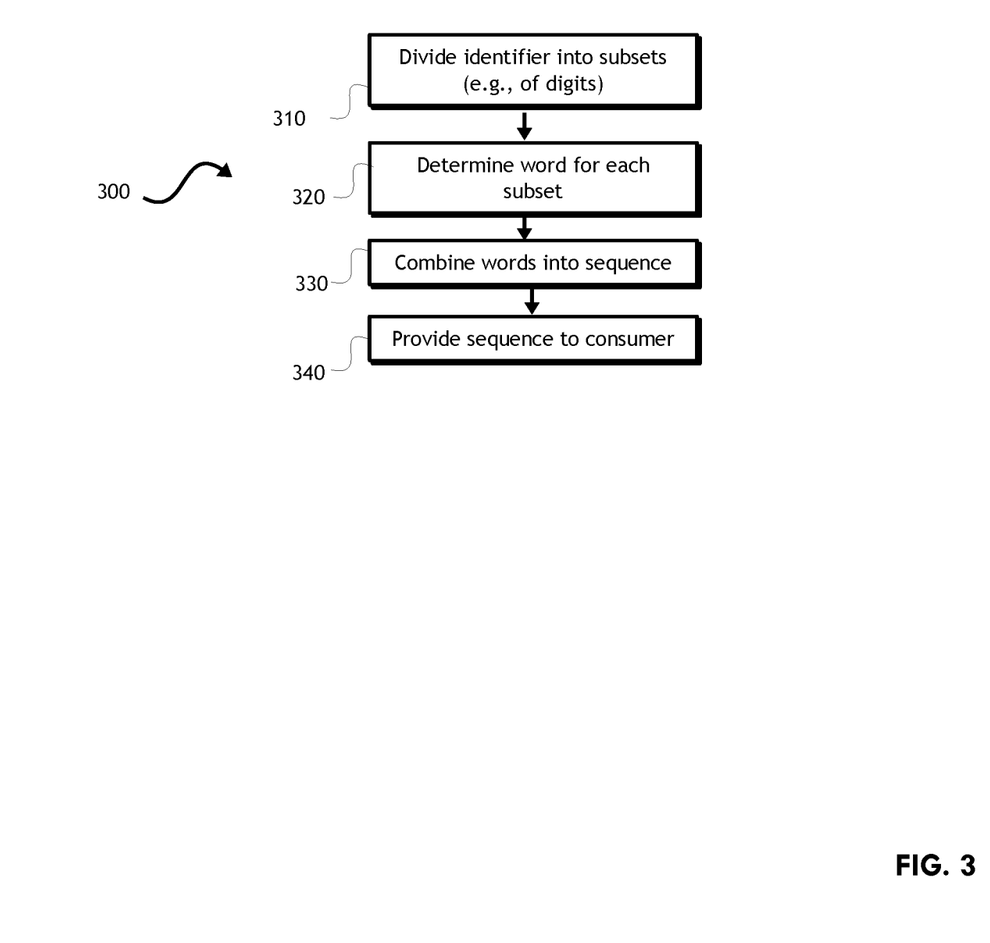
FIG. 3 is a flowchart of a non-limiting embodiment of a process for representing an identifier with a sequence of words according to the principles of the presently disclosed subject matter.

Referring now to FIG. 3, FIG. 3 is a flowchart of a non-limiting embodiment of a process 300 for representing an identifier with a sequence of words. In some non-limiting embodiments, one or more of the steps of process 300 may be performed (e.g., completely, partially, and/or the like) by transaction service provider system 102 (e.g., one or more devices of transaction service provider system 102). In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110).

As shown in FIG. 3, at step 310, process 300 may include dividing an identifier into a plurality of subsets. For example, transaction service provider system 102 (or issuer system 104 or customer device 106) may divide an identifier into a plurality of subsets. In some non-limiting embodiments, the identifier may include an account identifier (e.g., a PAN, a primary account number, a card number, a payment card number, a token, and/or the like). For example, transaction service provider system 102 (or issuer system 104 or customer device 106) may divide the account identifier (e.g., a PAN) into a plurality of subsets (e.g., of digits).

In some non-limiting embodiments, the identifier may include a PAN, which may include 16 digits. For example, 15 of the 16 digits may be freely usable and one digit (e.g., the last digit) may be a check digit based on the other 15 digits. Additionally or alternatively, the number of unique permutations of the 15 digits may be $10^{15}$. In some non-limiting embodiments, transaction service provider system 102 (or issuer system 104 or customer device 106) may divide the PAN into a plurality of subsets of digits. For example, the 15 or 16 digits of the PAN (e.g., excluding or including the check digit, respectively) may be divided into any suitable number of subsets.

In some non-limiting embodiments, assuming 15 digits of the PAN (e.g., excluding the check digit) are to be divided into subsets, transaction service provider system 102 (or issuer system 104 or customer device 106) may divide the 15 digits into two subsets, three subsets, four subsets, five subsets, and/or the like. For example, transaction service provider system 102 (or issuer system 104 or customer device 106) may divide the 15 digits of the PAN (e.g., excluding the check digit) into a first subset of three digits, a second subset of four digits, a third subset of four digits, and a fourth subset of four digits. In some non-limiting embodiments, a subset of three digits may have $10^3$ possible values (e.g., $10^3$ possible subsets of three digits). Additionally or alternatively, a subset of four digits may have $10^4$ possible values (e.g., $10^4$ possible subsets of four digits).

In some non-limiting embodiments, assuming 16 digits of the PAN (e.g., including the check digit) are to be divided into subsets, transaction service provider system 102 (or issuer system 104 or customer device 106) may divide the 16 digits into two subsets, three subsets, four subsets, five subsets, and/or the like. For example, transaction service provider system 102 (or issuer system 104 or customer device 106) may divide the 16 digits of the PAN (e.g., excluding the check digit) into first, second, third, and fourth subsets of four digits each. In some non-limiting embodiments, a subset of four digits may have $10^4$ possible values (e.g., $10^4$ possible subsets of four digits).

In some non-limiting embodiments, any suitable number of characters (e.g., digits, alphanumeric characters, hexadecimal numbers (e.g., hexits), binary numbers (e.g., bits), and/or the like) of any type of identifier (e.g., a PAN, a primary account number, a card number, a payment card number, a token, and/or the like) may be divided into any suitable number of subsets.

As shown in FIG. 3, at step 320, process 300 may include determining a word for each subset. For example, transaction service provider system 102 (or issuer system 104 or customer device 106) may determine a respective word from a database of words for each respective subset of digits of the plurality of subsets of digits. In some non-limiting embodiments, referring to the examples above in which 15 or 16 digits of the PAN (e.g., excluding or including the check digit, respectively) are to be divided into, e.g., four subsets, transaction service provider system 102 (or issuer system 104 or customer device 106) may determine a respective word for each of the four subsets (e.g., a first word for the first subset, a second word for the second subset, a third word for the third subset, and a fourth word of the fourth subset.

In some non-limiting embodiments, transaction service provider system 102 (or issuer system 104 or customer device 106) may receive (e.g., over network 112 and/or the like) and/or retrieve (e.g., from memory, a database, a server, and/or the like) a dictionary. For example, the dictionary may include a plurality of words. In some non-limiting embodiments, the dictionary may be a dictionary of a language familiar to a user (e.g., customer), such as an English dictionary for an English speaker, a French dictionary for a French speaker, and/or the like. In some non-limiting embodiments, the dictionary may be any suitable dictionary in any suitable language (and/or any suitable combination of languages) in any suitable format (e.g., digital, electronic, and/or the like). Additionally or alternatively, the words in the dictionary may include metadata, such as labels (e.g., labels for each word related to part of speech, slang terminology, offensive/negative terminology, and/or the like), and/or the like. Additionally or alternatively, the dictionary may be a single file or may be divided into multiple files (e.g., based on syntactic category, part of speech, alphabetic ordering, and/or the like). For the purpose of illustration and not limitation, the dictionary may be an English dictionary, such as the WordNet® lexical database of English, available from Princeton University.

In some non-limiting embodiments, a dictionary may include a certain number of words for each different part of speech (e.g., words labeled and/or categorized into at least one part of speech). For example, an English dictionary (e.g., WordNet® lexical database and/or the like) may include over 100,000 nouns (e.g., approximately 117,798 nouns), over 20,000 adjectives (e.g., approximately 21,479 adjectives), over 4,000 adverbs (e.g., 4,481 adverbs), and over 10,000 verbs (e.g., 11,529 verbs).

In some non-limiting embodiments, transaction service provider system 102 (or issuer system 104 or customer device 106) may filter (e.g., remove, discard, and/or the like) a portion of the plurality of words from the dictionary. For example, any size portion of the plurality of words may be filtered out, so long as the remaining portion may include sufficient words to have a unique word for every possible subset. In some non-limiting embodiments, referring to the examples above in which 15 or 16 digits of the PAN (e.g., excluding or including the check digit, respectively) are to be divided into, e.g., four subsets, each three-digit subset may be $10^3$ (e.g., $10^3$ possible subsets of three digits) possible values, and each four-digit subset may have $10^4$ possible values (e.g., $10^4$ possible subsets of four digits). In some non-limiting embodiments, after filtering, the remaining portion of the dictionary may include at least 1,000 (e.g., $10^3$) to represent possible subsets of three digits and/or may include at least 10,000 (e.g., $10^4$) to represent possible subsets of four digits.

In some non-limiting embodiments, transaction service provider system 102 (or issuer system 104 or customer device 106) may filter words from the dictionary based on metadata (e.g., labels and/or the like). For example, words labeled as slang terminology, offensive/negative terminology, rarely used terminology, and/or the like may be filtered from the dictionary. Additionally or alternatively, words may be filtered from the dictionary based on the length of words (e.g., filter out words longer than a selected and/or predetermined threshold length). Additionally or alternatively, words may be filtered based on categorization and/or labeling as different parts of speech.

In some non-limiting embodiments, the dictionary may be filtered so that the remaining portion of the dictionary may include a sufficient number of different parts of speech to represent different subsets (e.g., of digits). For example, transaction service provider system 102 (or issuer system 104 or customer device 106) may filter an English dictionary (e.g., WordNet® lexical database and/or the like) that the remaining portion includes at least 10,000 nouns (e.g., 50,000 nouns), at least 10,000 adjectives (e.g., 10,000 adjectives), at least 1,000 adverbs (e.g., 4,000 adverbs), and/or at least 1,000 verbs (e.g., 5,000 verbs). Additionally or alternatively, such filtering may reduce the size of the dictionary, e.g., such that the remaining portion is about half the size or less of the original dictionary.

In some non-limiting embodiments, the dictionary (or the remaining portion of the dictionary after filtering) may be stored as the database of words. For example, transaction service provider system 102 (or issuer system 104 or customer device 106) may store the dictionary (or the remaining portion of the dictionary after filtering) as the database of words.

In some non-limiting embodiments, at least one word from the database of words may be assigned for each possible subset of digits. For example, transaction service provider system 102 (or issuer system 104 or customer device 106) may assign as least one word of the database of words (e.g., the dictionary or the remaining portion of the dictionary after filtering) to each possible subset of digits. In some non-limiting embodiments, words may be assigned to possible subsets based on alphabetical order in the database of words, e.g., first word in the database assigned to the first possible value (e.g., 000 for 3-digit subset, 0000 for 4-digit subset, and/or the like), second word in the database assigned to the second possible value (e.g., 001 for 3-digit subset, 0001 for 4-digit subset, and/or the like), etc., and/or the like. Additionally or alternatively, words may be assigned to possible subsets based on labeling (e.g., as part of speech and/or the like) and alphabetical order. For example, the first 1,000 or 10,000 nouns in the database may be assigned to the 1,000 or 10,000 possible values of three-digit or four-digit subsets, respectively; the first 1,000 or 10,000 adjectives in the database may be assigned to the 1,000 or 10,000 possible values of three-digit or four-digit subsets, respectively; the first 1,000 adverbs may be assigned to the 1,000 possible values of three-digit subsets; and/or the first 1,000 verbs may be assigned to the 1,000 possible values of three-digit subsets.

In some non-limiting embodiments, words may be assigned (e.g, by transaction service provider system 102, issuer system 104, or customer device 106) to possible subsets based on any suitable technique, including a hash function such as a perfect hash function, dynamic perfect hashing, a minimal perfect hash function, and/or the like. For example, a perfect hash function F may transform an n-element set of words W into a set of integers, and the function F may uniquely map the words in the set W onto the range 0 to k, where k≥n−1. Additionally or alternatively, if k≥n−1, the function F may be a minimal perfect hash function, in which the n words of the set W may be mapped to n consecutive integers (e.g., 0 to n−1). For example, the set of words W, or subsets of words (e.g., $W_1$ for nouns, $W_2$ for adjectives, $W_3$ for adverbs, $W_4$ for verbs, and/or the like) may be received and/or provided, as described herein. In some non-limiting embodiments, a pair of minimal perfect hash functions F and G (or respective pairs of minimal perfect hash functions for respective subsets of words, e,g., $F_1$ and $G_1$ for $W_1$, $F_2$ and $G_2$ for $W_2$, $F_3$ and $G_3$ for $W_3$, $F_4$ and $G_4$ for $W_4$, and/or the like) may be generated using any suitable technique, including a hash function generator such as GNU gperf and/or the like, and the function F may return an integer value given an input word (e.g., a string s) while the function G may return an indication (e.g., Boolean value, single bit flag, and/or the like) whether an input word (e.g., a string s) is valid and is part of the original set of words W (or a respective subset of words, e.g., $W_1$ for nouns, $W_2$ for adjectives, $W_3$ for adverbs, $W_4$ for verbs, and/or the like), e.g., 1 or True for a valid word and 0 or False for an invalid word. In some non-limiting embodiments, a lookup table may be generated and/or stored (e.g, by transaction service provider system 102, issuer system 104, or customer device 106), and the lookup table may include the mapping of integers to respective words. In some non-limiting embodiments, the lookup table may be stored only by transaction service provider system 102. Additionally or alternatively, the minimal perfect hash function pair F and G (or pairs of minimal perfect hash functions $F_1$ and $G_1$, $F_2$ and $G_2$, $F_3$ and $G_3$, $F_4$ and $G_4$, and/or the like) may be communicated by transaction service provider system 102 to another system and/or device (e.g., issuer system 104, customer device 106, merchant system 108, acquirer system 110, and/or the like).

In some non-limiting embodiments, at least one word from the database of words may be determined for each respective subset (e.g., of digits) based on the word(s) assigned to a possible subset of digits corresponding to (e.g., matching) the respective subset of digits. For example, transaction service provider system 102 (or issuer system 104 or customer device 106) may determine which word(s) from the database of words are assigned to a possible subset (e.g., of digits) corresponding to (e.g., matching) the respective subset (e.g., of digits). For example, transaction service provider system 102 (or issuer system 104 or customer device 106) could make the determination based on a mapping (e.g., lookup table, database, and/or the like) associating each possible subset (e.g., of digits) with the word(s) assigned thereto.

In some non-limiting embodiments, words may be determined for each respective subset (e.g, by transaction service provider system 102, issuer system 104, merchant system 108, acquirer system 110, and/or or customer device 106) based on any suitable technique, including a hash function such as a perfect hash function, dynamic perfect hashing, a minimal perfect hash function, and/or the like, as described herein. For example, if a lookup table based on such a hashing function (e.g., minimal perfect hash function) is stored (e.g., by transaction service provider system 102, issuer system 104, customer device 106, and/or the like), the device and/or system upon which the lookup table is stored may determine the words associated with each subset of digits (e.g., three- or four-digit subset corresponding to an integer value) based on the lookup table.

In some non-limiting embodiments, each respective subset may be represented as a selected part of speech (e.g., noun, pronoun, adjective, determiner, verb, adverb, preposition, conjunction, interjection, and/or the like), which may be determined by the transaction service provider system 102 (or issuer system 104 or customer device 106). For example, referring to the examples above in which 15 or 16 digits of the PAN (e.g., excluding or including the check digit, respectively) are to be divided into, e.g., four subsets, each of the four subsets may be represented by a respective part of speech. In some non-limiting embodiments, each of the four subsets may be represented by a respective noun. For example, assuming 50,000 nouns (e.g., after filtering the dictionary into a database of words), $50,000^4$ (i.e., $50,000*50,000*50,000*50,000=625\times10^{16}$) possible identifiers may be represented. In some non-limiting embodiments, some of the subsets may be represented by one part of speech (e.g., adjectives) and some of the subsets may be represented by another part of speech (e.g., nouns). For example, assuming 10,000 adjectives to represent each of the first two subsets and 50,000 nouns to represent each of the last two subsets (e.g., after filtering the dictionary into a database of words), $10,000*10,000*50,000*50,000=25\times10^{16}$ possible identifiers may be represented. In some non-limiting embodiments, the respective word for the first subset may include an adverb, the respective word for the second subset may include a first adjective, the respective word for the third subset may include a second adjective, and the respective word for the fourth subset may include a noun. For example, assuming 4,000 adverbs, 10,000 adjectives, and 50,000 nouns (e.g., after filtering the dictionary into a database of words), 4,000*10,000*10,000*50,000=2*10$^{16}$ possible identifiers may be represented.

In some non-limiting embodiments, the sequence of words including an adverb, an adjective, an adjective, and a noun may be easiest for a user (e.g., customer) to remember. For example, such a sequence may be similar to the natural flow of words in grammar of the particular language (e.g., English). In some non-limiting embodiments, words of different parts of speech in different order may be used to represent identifiers based on the language and/or a familiar sounding (e.g., naturally flowing) grammar thereof.

As shown in FIG. 3, at step 330, process 300 may include combining the words into a sequence. For example, transaction service provider system 102 (or issuer system 104 or customer device 106) may combine the respective words for the plurality of subsets of digits into a sequence of words. For example, referring to the examples above in which 15 or 16 digits of the PAN (e.g., excluding or including the check digit, respectively) are to be divided into four subsets, the sequence of words may include, in order, first noun, second, noun, third noun, and fourth noun; first adjective, second adjective, first noun, and second noun; adverb, first adjective, second adjective, and noun; and/or the like.

As shown in FIG. 3, at step 340, process 300 may include providing the sequence of words to the customer. For example, transaction service provider system 102 (or issuer system 104) may communicate (e.g., via network 112) the sequence of words to customer device 106. Additionally or alternatively, customer device 106 may receive (e.g., via network 112), store, and/or display the sequence of words. In some non-limiting embodiments, transaction service provider system 102 may communicate (e.g., via network 112) the sequence of words to issuer system 104 based on receiving (e.g., via network 112) a request from issuer system 104, and issuer system 104 may then communicate (e.g., via network 112) the sequence of words to customer device 106.

Figure 4:
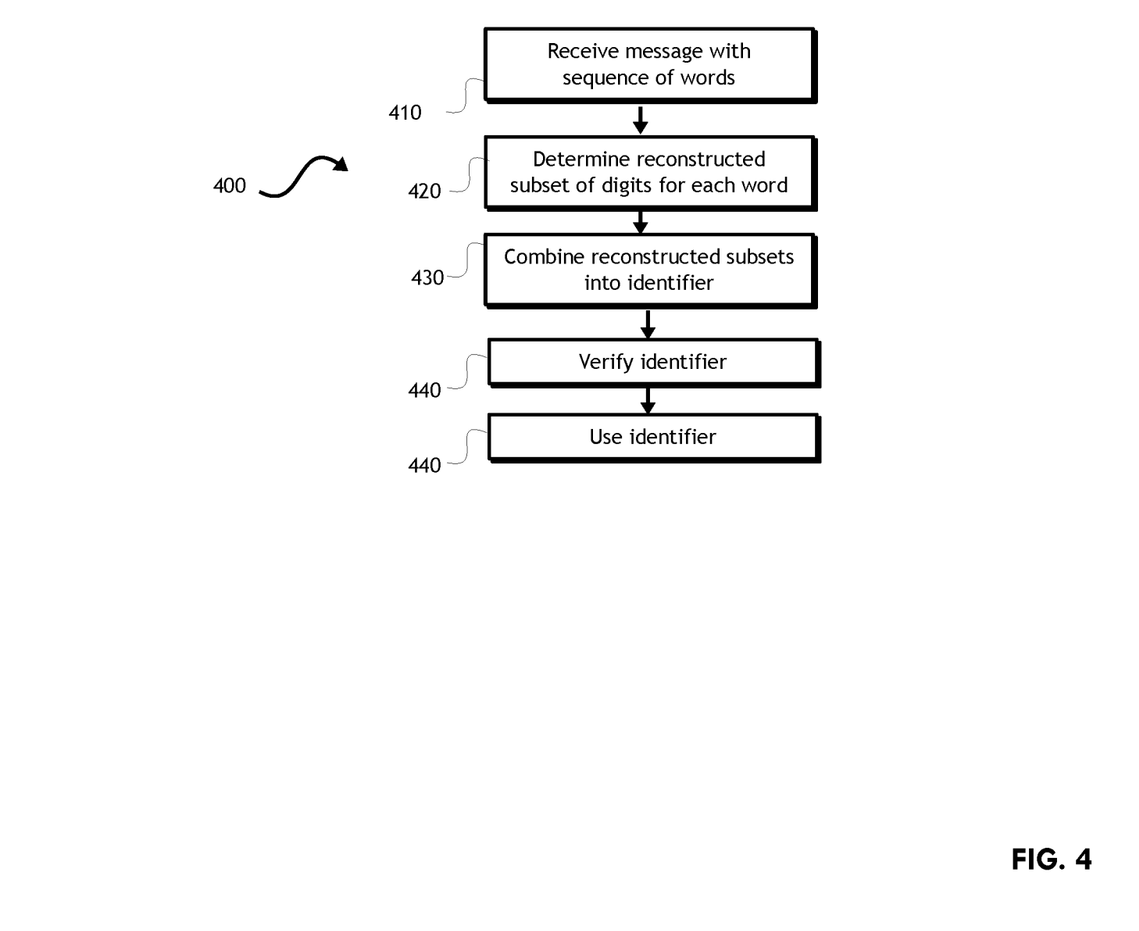
FIG. 4 is a flowchart of a non-limiting embodiment of a process for using a sequence of words that represents an identifier according to the principles of the presently disclosed subject matter.

Referring now to FIG. 4, FIG. 4 is a flowchart of a non-limiting embodiment of a process 400 for using a sequence of words that represents an identifier. In some non-limiting embodiments, one or more of the steps of process 400 may be performed (e.g., completely, partially, and/or the like) by transaction service provider system 102 (e.g., one or more devices of transaction service provider system 102). In some non-limiting embodiments, one or more of the steps of process 400 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), and/or acquirer system 110 (e.g., one or more devices of acquirer system 110). In some non-limiting embodiments, one or more of the steps of process 400 may be performed subsequent to process 300. In some non-limiting embodiments, one or more of the steps of process 400 may be performed (e.g., completely, partially, and/or the like) simultaneous with, prior to, and/or independent of process 300.

As shown in FIG. 4, at step 410, process 400 may include receiving a message with a sequence of words. For example, transaction service provider system 102 (or issuer system 104) may receive (e.g., via network 112) a message including the sequence of words from merchant system 108 (or customer device 106 or acquirer 110).

In some non-limiting embodiments, the message may include an authorization request. For example, transaction service provider system 102 (or issuer system 104) may receive (e.g., via network 112) an authorization request including the sequence of words from merchant system 108 (or customer device 106 or acquirer 110). Additionally or alternatively, the authorization request may lack an account identifier (other than the sequence of words representing the account identifier). In some non-limiting embodiments, the sequence of words may be included in at least one field of the authorization request designated for account identifier. In some non-limiting embodiments, the sequence of words may be included (e.g., completely, partially, and/or the like) in at least one other field, separate from or including the at least one field designated for the account identifier, such as a discretionary data field and/or the like.

As shown in FIG. 4, at step 420, process 400 may include determining a reconstructed subset of digits for each word of the sequence. For example, transaction service provider system 102 (or issuer system 104) may determine a reconstructed subset of digits for each word of the sequence of words.

In some non-limiting embodiments, transaction service provider system 102 (or issuer system 104) may determine the reconstructed subset of digits for each word based on the reverse of the technique described herein at step 320. In some non-limiting embodiments, a reconstructed subset of digits may be determined for each word of the sequence of words based on a possible subset of digits associated with and/or assigned to the respective word, as described herein. For example, transaction service provider system 102 (or issuer system 104 or customer device 106) may determine which possible subset (e.g., of digits) is associated with and/or assigned to the respective word in the database of words. For example, transaction service provider system 102 (or issuer system 104 or customer device 106) could make the determination based on a mapping (e.g., lookup table, database, and/or the like) associating each possible subset (e.g., of digits) with the word(s) assigned thereto. In some non-limiting embodiments, a reconstructed subset may be determined (e.g., by transaction service provider system 102, issuer system 104, merchant system 108, acquirer system 110, and/or or customer device 106) for each respective word based on any suitable technique, including a hash function such as a perfect hash function, dynamic perfect hashing, a minimal perfect hash function, and/or the like, as described herein. For example, if a hashing function (e.g., minimal perfect hash function) is used to assign word to subsets of digits (e.g., three- or four-digit subsets corresponding to integer values), the hashing function(s) (e.g., F and G) may be used to determine the reconstructed subsets, as described herein. For example, a device or system (e.g., transaction service provider system 102, issuer system 104, merchant system 108, acquirer system 110, and/or or customer device 106) may receive the sequence of words, and such device or system may use a hash function (e.g., G) to confirm whether each word is in the original set of words W, as described herein, and/or use a hash function (e.g., F) to determine (e.g., return) the reconstructed subset of digits (e.g., a three- or four-digit subset corresponding to an integer value) for each word.

As shown in FIG. 4, at step 430, process 400 may include combining the reconstructed subsets into a reconstructed identifier. For example, transaction service provider system 102 (or issuer system 104) may combine the reconstructed subsets of digits into a reconstructed account identifier (e.g., reconstructed PAN).

As shown in FIG. 4, at step 440, process 400 may include verifying the reconstructed identifier. For example, transaction service provider system 102 (or issuer system 104) may determine the reconstructed account identifier (e.g., reconstructed PAN) matches the account identifier (e.g., PAN) of the customer. Additionally or alternatively, transaction service provider system 102 (or issuer system 104) may calculate a check digit based on the digits of the reconstructed identifier (e.g., reconstructed PAN) and compare the calculated check digit to the check digit of the identifier (e.g., PAN). For example, referring to the examples above in which 15 digits of the PAN (e.g., excluding the check digit) are represented by the sequence of words, transaction service provider system 102 (or issuer system 104) may calculate the check digit based on the 15-digit reconstructed PAN associated with the sequence of words and compare the calculated check digit to the check digit of the original PAN.

As shown in FIG. 4, at step 450, process 400 may include using the reconstructed identifier. For example, transaction service provider system 102 (or issuer system 104) may use the reconstructed identifier (e.g., reconstructed PAN) to process a payment transaction as the transaction service provider system 102 (or issuer system 104) normally would after receiving the account identifier. In some non-limiting embodiments, transaction service provider system 102 may communicate (e.g., over network 112) a second message (e.g., second authorization request) to issuer system 104, and the second message (e.g., second authorization request) may include the reconstructed identifier (e.g., reconstructed PAN). In some non-limiting embodiments, transaction service provider system 102 (or issuer system 104) may use the original identifier (e.g., PAN) after verification of the reconstructed identifier.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method to securely process payment transactions by generating words to replace account identifiers using one-way hash functions, comprising:
    receiving, with a transaction service provider system, a set of words;
    generating, with the transaction service provider system, a pair of one-way hash functions based on the set of words and a lookup table based on the set of words, the pair of one-way hash functions comprising a first one-way hash function to map each respective word in the set of words to a respective integer and a second one-way hash function to indicate whether an input word is valid and in the set of words, the lookup table comprising a mapping of each respective integer to the respective word in the set of words;
    communicating, with the transaction service provider system, the first one-way hash function to an issuer system without communicating the lookup table;
    communicating, with the transaction service provider system, the second one-way hash function to at least one of a merchant system or an acquirer system without communicating the lookup table;
    dividing, with the issuer system, an account identifier number of a customer into a plurality of subsets of digits;
    determining, with the issuer system, a respective word from the set of words for each respective subset of digits of the plurality of subsets of digits based on the first one-way hash function;
    combining, with the issuer system, the respective words for the plurality of subsets of digits into a sequence of words;
    providing, with the issuer system, the sequence of words to a customer device of the customer;
    receiving, with the at least one of the merchant system or the acquirer system, the sequence of words from the customer;
    determining, with the at least one of the merchant system or the acquirer system, whether each word of the sequence of words is valid and in the set of words based on the second one-way hash function;
    receiving, with the transaction service provider system, an authorization request for a payment transaction from the at least one of the merchant system or the acquirer system, the authorization request including the sequence of words in a field designated for an account identifier, the authorization request not including the account identifier number;
    determining, with the transaction service provider system, a reconstructed subset of digits for each word of the sequence of words based on the lookup table;
    combining, with the transaction service provider system, the reconstructed subsets of digits into a reconstructed account identifier number;
    determining, with the transaction service provider system, the reconstructed account identifier number matches the account identifier number of the customer;
    communicating, with the transaction service provider system, a second authorization request for the payment transaction including the reconstructed account identifier number in the field designated for the account identifier to the issuer system; and
    processing, with the issuer system, the payment transaction using the reconstructed account identifier number as the issuer system would process the payment transaction using the account identifier number.

2. The method of claim 1, wherein the plurality of subsets of digits comprises a first subset of three digits, a second subset of four digits, a third subset of four digits, and a fourth subset of four digits.

3. The method of claim 2, wherein the respective word for the first subset comprises an adverb, the respective word for the second subset comprises a first adjective, the respective word for the third subset comprises a second adjective, and the respective word for the fourth subset comprises a noun.

4. The method of claim 3, wherein the sequence of words comprises, in order, the adverb, the first adjective, the second adjective, and the noun.

5. The method of claim 1, further comprising:
    receiving, with the transaction service provider system, a dictionary comprising a plurality of words;

filtering, with the transaction service provider system, a portion of the plurality of words from the dictionary; and storing, with the transaction service provider system, a remaining portion of the plurality of words as the set of words.

6. A system to securely process payment transactions by generating words to replace account identifiers using one-way hash functions, comprising:

a transaction service provider system configured to:
  receive a set of words;
  generate a pair of one-way hash functions based on the set of words and a lookup table based on the set of words, the pair of one-way hash functions comprising a first one-way hash function to map each respective word in the set of words to a respective integer and a second one-way hash function to indicate whether an input word is valid and in the set of words, the lookup table comprising a mapping of each respective integer to the respective word in the set of words; and
  communicate the first one-way hash function over a network without communicating the lookup table;
  communicate the second one-way hash function over the network without communicating the lookup table; and an issuer system configured to:
  receive the first one-way hash function over the network;
  divide an account identifier number of a customer into a plurality of subsets of digits;
  determine a respective word from the set of words for each respective subset of digits of the plurality of subsets of digits based on the first one-way hash function;
  combine the respective words for the plurality of subsets of digits into a sequence of words; and
  communicate the sequence of words over the network to the customer;

at least one of a merchant system or an acquirer system configured to:
  receive the sequence of words from the customer; and
  determine whether each word of the sequence of words is valid and in the set of words based on the second one-way hash function, wherein the transaction service provider system is further configured to:
  receive, over the network, an authorization request for a payment transaction from the at least one of the merchant system or the acquirer system, the authorization request including the sequence of words in a field designated for an account identifier, the authorization request not including the account identifier number;
  determine a reconstructed subset of digits for each word of the sequence of words based on the lookup table;
  combine the reconstructed subsets of digits into a reconstructed account identifier number;
  determine the reconstructed account identifier number matches the account identifier number of the customer; and
  communicate a second authorization request for the payment transaction including the reconstructed account identifier number in the field designated for the account identifier over the network to the issuer system, wherein the issuer system is further configured to:
  process the payment transaction using the reconstructed account identifier number as the issuer system would process the payment transaction using the account identifier number.

7. The system of claim 6, further comprising a customer device of the customer configured to receive, from the issuer system over the network, the sequence of words.

8. The system of claim 6, wherein the plurality of subsets of digits comprises a first subset of three digits, a second subset of four digits, a third subset of four digits, and a fourth subset of four digits,
  wherein the respective word for the first subset comprises an adverb, the respective word for the second subset comprises a first adjective, the respective word for the third subset comprises a second adjective, and the respective word for the fourth subset comprises a noun, and
  wherein the sequence of words comprises, in order, the adverb, the first adjective, the second adjective, and the noun.

9. The system of claim 6, wherein the transaction service provider system is further configured to:
  receive a dictionary comprising a plurality of words;
  filter a portion of the plurality of words from the dictionary; and
  store a remaining portion of the plurality of words as the set of words.

* * * * *